(12) United States Patent
Shimizu et al.

(10) Patent No.: US 9,403,705 B2
(45) Date of Patent: Aug. 2, 2016

(54) WATER TREATMENT METHOD AND APPARATUS THEREFOR

(71) Applicant: KURITA WATER INDUSTRIES LTD., Nakano-ku, Tokyo (JP)

(72) Inventors: Satoshi Shimizu, Tokyo (JP); Mitsuharu Terashima, Kitakyushu (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 0 days.

(21) Appl. No.: 14/423,880

(22) PCT Filed: Sep. 3, 2013

(86) PCT No.: PCT/JP2013/073643
§ 371 (c)(1),
(2) Date: Feb. 25, 2015

(87) PCT Pub. No.: WO2014/038537
PCT Pub. Date: Mar. 13, 2014

(65) Prior Publication Data
US 2015/0197435 A1  Jul. 16, 2015

(30) Foreign Application Priority Data

Sep. 10, 2012  (JP) .................................. 2012-198559

(51) Int. Cl.
C02F 1/56 (2006.01)
B01D 21/06 (2006.01)
(Continued)

(52) U.S. Cl.
CPC . *C02F 1/56* (2013.01); *B01D 21/06* (2013.01); *C02F 1/5236* (2013.01);
(Continued)

(58) Field of Classification Search
None
See application file for complete search history.

(56) References Cited

U.S. PATENT DOCUMENTS 5,906,750 A * 5/1999 Haase .................... C02F 11/14
210/609
2010/0230331 A1  9/2010 Fukuda et al.

FOREIGN PATENT DOCUMENTS

JP  S61-074700 A  4/1986
JP  H02-261505 A  10/1990
(Continued)

OTHER PUBLICATIONS

PCT, "International Search Report for International Application No. PCT/JP2013/073643".
(Continued)

Primary Examiner — Chester Barry
(74) Attorney, Agent, or Firm — Manabu Kanesaka

(57) ABSTRACT

In a water treatment method and an apparatus therefor, after an anionic polymer flocculant is added to water to be treated, granulation is performed by stirring, and solid-liquid separation is then performed to obtain treated water, and flocs which are not disintegrated by a shearing force during stirring and have a preferable settling property can be formed, so that the quality of treated water is also improved. Particularly, a water treatment method includes a flocculating step of adding an anionic polymer flocculant to water to be treated to form flocculated flocs, a subsequent granulating step of stirring the water to be treated to granulate the flocculated flocs, and a solid-liquid separation step of performing solid-liquid separation of generated granulated substances, wherein a cationic polymer flocculant having a cationic group rate of 10 to 50 mole % is added to the water to be treated before the anionic polymer flocculant is added.

14 Claims, 6 Drawing Sheets

(51) Int. Cl.
    *C02F 1/52*     (2006.01)
    *C02F 1/00*     (2006.01)
    *C02F 101/10*   (2006.01)
    *C02F 101/14*   (2006.01)
    *C02F 101/20*   (2006.01)
    *C02F 103/00*   (2006.01)
    *C02F 103/16*   (2006.01)

(52) U.S. Cl.
    CPC .... *C02F 2001/007* (2013.01); *C02F 2101/105* (2013.01); *C02F 2101/14* (2013.01); *C02F 2101/20* (2013.01); *C02F 2103/001* (2013.01); *C02F 2103/007* (2013.01); *C02F 2103/16* (2013.01)

(56) References Cited

FOREIGN PATENT DOCUMENTS

| JP | H05-337474 A | 12/1993 |
| JP | H06-055004 A | 3/1994 |
| JP | H11-169609 A | 6/1999 |
| JP | 2003-145168 A | 5/2003 |
| JP | 2004-255349 A | 9/2004 |
| JP | 2007-098325 A | 4/2007 |
| JP | 2007-203133 A | 8/2007 |
| JP | 2007-275727 A | 10/2007 |
| JP | 2010-023008 A | 2/2010 |
| JP | 2011-139997 A | 7/2011 |
| JP | 2011-194306 A | 10/2011 |
| JP | 2011-194385 A | 10/2011 |

OTHER PUBLICATIONS

Japan Patent Office, "Office Action for JP 2014-534361," Aug. 11, 2015.

* cited by examiner

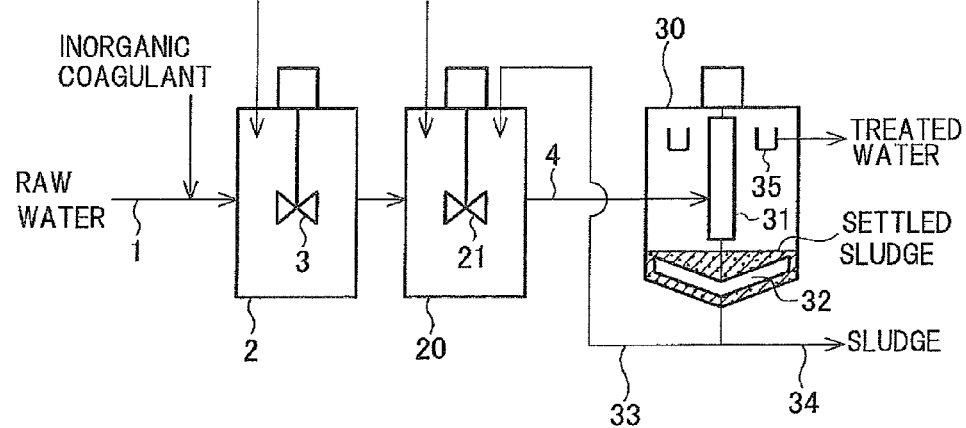
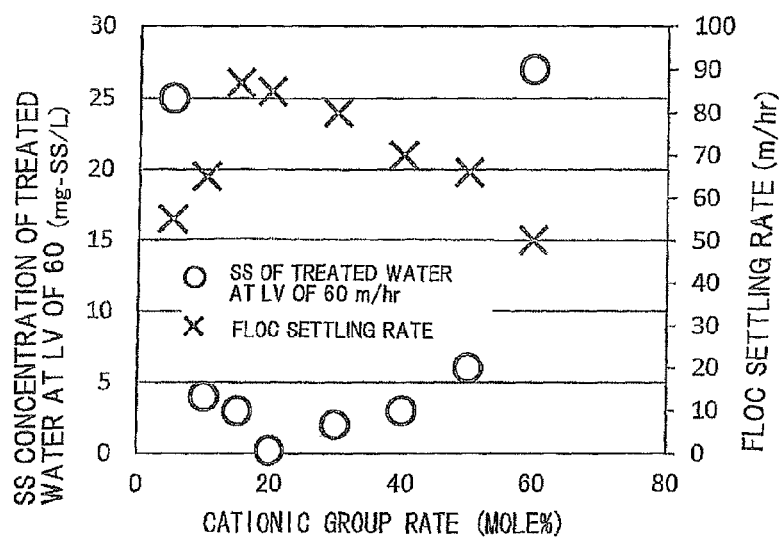

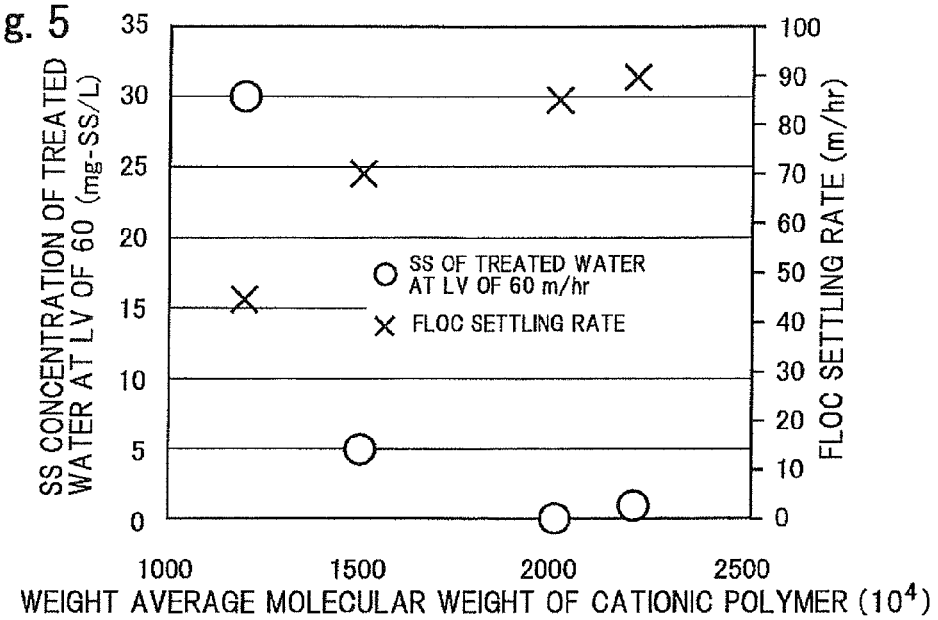
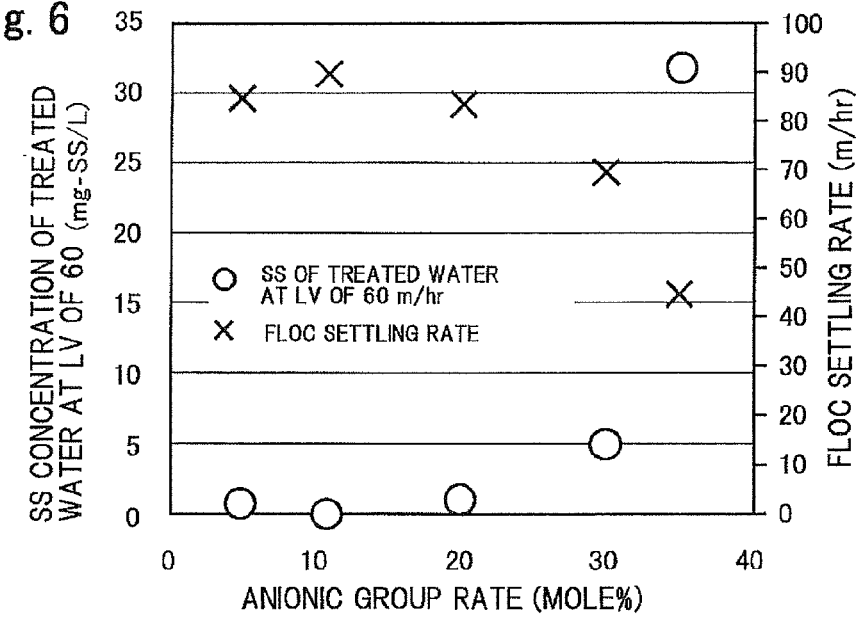

WATER TREATMENT METHOD AND APPARATUS THEREFOR

RELATED APPLICATIONS

The present application is National Phase of International Application No. PCT/JP2013/073643 filed Sep. 3, 2013, and claims priority from Japanese Application No. 2012-198559, filed Sep. 10, 2012, the disclosure of which is hereby incorporated by reference herein in its entirety.

FIELD OF INVENTION

The present invention relates to a water treatment method and an apparatus therefor, in each of which fine suspended solids contained in water, such as river water, rain water, or industrial water and drainage, are flocculated and separated from the water, or relates to a water treatment method and an apparatus therefor, in each of which inclusions, such as a heavy metal, fluorine, and/or phosphorus acid, contained in water are flocculated and separated therefrom.

BACKGROUND OF INVENTION

It has been known that after an inorganic coagulant is added to raw water (water to be treated), such as industrial wastewater or sewage water, solid-liquid separation is performed by simultaneously adding an anionic polymer flocculant and a cationic polymer flocculant (comparative examples 6 and 10 of Patent Literature 1).

Patent Literature 2 discloses that after a flocculated product is generated by addition of an inorganic coagulant to raw water, such as city water, sewage water, or industrial waste water, an organic polymer flocculant is added, and granular substances are then settled by performing stirring granulation.

Patent Literature 3 discloses that in a drainage water treatment or a water treatment, after a flocculated product is generated by addition of an inorganic coagulant to raw water, an organic polymer flocculant is added thereto, and flocculation/liquid-solid separation is then performed by revolution in a liquid cyclone.

Patent Literature 4 discloses that after an anionic polymer flocculant is added to a suspension liquid containing metal hydroxides, such as drainage water discharged from a plating plant, a cationic polymer flocculant is added, and subsequently, solid-liquid separation is performed by stirring granulation. Since a shearing force is applied to a flocculated product by stirring thereof, mechanical dehydration of flocs is promoted, and as a result, flocculates (pellets) having a high density are formed. Since the pellets thus granulated have a high settling rate than that of normal flocs, the surface loading can be increased as compared to that obtained by a general sludge blanket type flocculating and settling apparatus, and hence, the size of the apparatus can be made compact.

Patent Literature 5 has disclosed a method for treating heavy metal-containing drainage water in which heavy metal-containing water is neutralized and is simultaneously processed by a flocculating treatment by addition of a polymer.

Patent Literature 6 has disclosed a method for treating fluorine-containing water and an apparatus therefor, in each of which after insoluble iron phosphate is generated by a reaction between fluorine-containing water and iron, solid-liquid separation is performed by addition of a polyacrylamide-based polymer flocculant.

PATENT LITERATURE

Patent Literature 1: Japanese Patent Publication 2003-145168 A

Patent Literature 2: Japanese Patent Publication 11-169609 A

Patent Literature 3: Japanese Patent Publication 2010-214248 A

Patent Literature 4: Japanese Patent Publication 6-55004 A

Patent Literature 5: Japanese Patent Publication 5-337474 A

Patent Literature 6: Japanese Patent Publication 2007-98325 A

OBJECT AND SUMMARY OF INVENTION

Technical Problem

When flocs are granulated in a granulation type flocculating and settling apparatus by stirring a blanket zone, some granulated flocs (pellets) are liable to be finely disintegrated by a shearing force of a stirring blade. The finely disintegrated flocs flow directly into treated water, and hence the quality thereof is degraded.

The present invention aim to improve a water treatment method and an apparatus therefor, in each of which after an anionic polymer flocculant is added to water to be treated, granulation is performed by stirring, and solid-liquid separation is then performed to obtain treated water. An object of the present invention is to provide a water treatment method and an apparatus therefor, in each of which flocs having preferable settleability and strength so as not to be disintegrated by a shearing force during stirring can be formed, and in each of which the quality of treated water is also improved.

Solution to Problem

A water treatment method of the present invention includes a step of adding an anionic polymer flocculant to water to be treated to form flocculated flocs; a step of stirring the water to be treated to granulate the flocculated flocs; and a step of performing solid-liquid separation of generated granulated substances to obtain treated water, wherein a cationic polymer flocculant having a cationic group rate of 10 to 50 mol % is added to the water to be treated, before the anionic polymer flocculant is added.

A water treatment apparatus of the present invention includes anionic polymer flocculant addition means for adding an anionic polymer flocculant to water to be treated; stirring means which is provided at a downstream side of the anionic polymer flocculant adding means and which granulates flocculated flocs by stirring water to be treated; and solid-liquid separation means for performing solid-liquid separation of water to be treated which is stirred by the stirring means to obtain treated water, wherein the apparatus further includes cationic polymer flocculant addition means for adding a cationic polymer flocculant having a cationic group rate of 10 to 50 mole % at an upstream side of the anionic polymer flocculant addition means.

According to one aspect of the present invention, an inorganic coagulant is first added to water to be treated. The addition of this inorganic coagulant may be performed simultaneously with the addition of the cationic polymer flocculant or may be performed prior thereto.

According to another aspect of the present invention, water to be treated contains a heavy metal, and the water to be treated is first neutralized to settle a heavy metal hydroxide. This neutralization treatment may be performed simultaneously with the addition of the cationic polymer flocculant or may be performed prior thereto.

Advantageous Effects of Invention

As the results of various types of research carried out by the present inventors, it was found that after an inorganic coagulant is added to water to be treated, if needed, or after a neutralization treatment is performed if water to be treated contains a heavy metal, when a cationic polymer flocculant and an anionic polymer flocculant are added in this order to perform granulation type flocculating and settling, flocculates having a high floc strength and a high density can be formed. In particular, it was found that when a cationic polymer flocculant having a cationic group rate of 10 to 50 mole % is used as the cationic polymer flocculant, flocs which have a high density and which are not likely to be disintegrated can be formed.

The present invention was made based on the above finding. According to the present invention, since flocs are not likely to be finely disintegrated when receiving a shearing force generated by stirring during a stirring granulation step, fine flocs in the form of SS are suppressed from being mixed with treated water, so that clear treated water can be obtained. In addition, since the granulated substance has a high density and a high settling rate, a high loading treatment can be performed.

BRIEF DESCRIPTION OF DRAWINGS

FIG. 3 shows a flow diagram of a water treatment method according to an embodiment and an apparatus therefor.

FIG. 4 is a graph showing experimental results.
FIG. 5 is a graph showing experimental results.
FIG. 6 is a graph showing experimental results.

DESCRIPTION OF EMBODIMENTS

Figure 1:
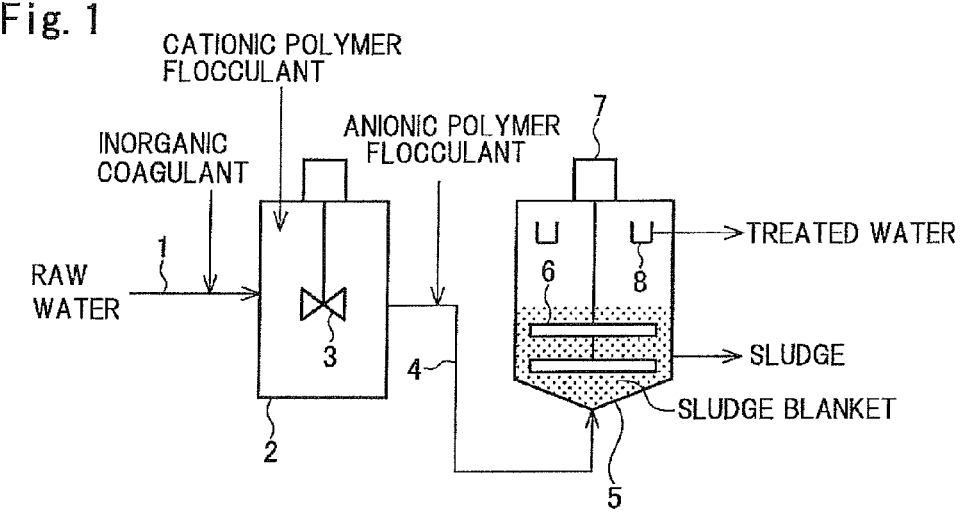
FIG. 1 shows a flow diagram of a water treatment method according to an embodiment and an apparatus therefor.

<First Aspect of Addition of Inorganic Coagulant>

A first aspect of the present invention relates to a water treatment method and an apparatus therefor, in each of which after an inorganic coagulant, a cationic polymer flocculant, and an anionic polymer flocculant are added to water to be treated, granulation is performed by stirring, and solid-liquid separation is then performed to obtain treated water.

[Water to be Treated and Flocculant]

Water to be treated is not particularly limited as long as being water containing fine suspended solids, such as river water, rain water, or industrial water and drainage, and water containing a heavy metal, fluorine, or phosphorus acid. In addition, when suspended solids-containing water is the water to be treated, the SS concentration thereof is preferably 1 to 10,000 mg/L and particularly preferably 20 to 2,000 mg/L. In addition, when fluorine-containing water is the water to be treated, the fluorine concentration is preferably approximately 10 to 10,000 mg/L, and when phosphoric acid-containing water is the water to be treated, the concentration of phosphorus acid is preferably approximately 5 to 10,000 mg/L.

As the inorganic coagulant, for example, PAC, poly iron (polyferric sulfate), iron chloride (ferric chloride), or band sulfate, each of which forms a hydroxide, is preferable. In addition, for fluorine-containing water and phosphoric acid-containing water, a calcium compound, such as hydrated lime, may also be used as the inorganic coagulant. The addition amount of the inorganic coagulant is preferably 10 to 1,000 mg/L and particularly preferably approximately 20 to 500 mg/L.

As the cationic polymer flocculant, an acrylamide-based flocculant is preferable, and the cationic group rate thereof is preferably 10 to 50 mole %, particularly preferably 15 to 40 mole %, and further preferably 20 to 30 mole %. The weight average molecular weight of the cationic polymer flocculant is preferably 12,000,000 to 25,000,000 and particularly preferably approximately 15,000,000 to 22,000,000. The addition amount of the cationic polymer flocculant is preferably 0.2 to 5 mg/L and particularly preferably 1 to 3 mg/L.

As the cationic polymer flocculant described above, generally used cationic polymer flocculants may be used, and in particular, a copolymer between a cationic monomer and acrylamide may be preferably used. As particular examples of the cationic monomer, although acid salts of (dimethylamino)ethyl acrylate and (dimethylamino)ethyl methacrylate (hereinafter, those two compounds may be collectively referred to "(dimethylamino)ethyl(meth)acrylate" in some cases) or quaternary ammonium salts thereof and acid salts of (dimethylamino)propyl acrylamide and (dimethylamino)propyl methacrylamide (hereinafter, those two compounds may be collectively referred to "(dimethylamino)propyl(meth)acrylate" in some cases) or quaternary ammonium salts thereof may be preferably used, the cationic polymer flocculant is not limited thereto. In addition, the finished product form of the cationic polymer flocculant is not particularly limited, and commercially available general forms used for drainage-water flocculation treatment, such as a powder, a W/O type emulsion, and a dispersion in which cationic polymer flocculant grains are dispersed in an aqueous medium having a high salt concentration, may be used.

As the anionic polymer flocculant, an acrylamide-based flocculant is preferable, and the anionic group rate thereof is preferably 5 to 30 mole % and particularly preferably 5 to 20 mole %. The weight average molecular weight of the anionic polymer flocculant is preferably 9,000,000 to 20,000,000 and particularly preferably approximately 12,000,000 to 18,000,000. The addition amount of the anionic polymer flocculant is preferably 0.2 to 8 mg/L and particularly preferably 2 to 6 mg/L.

As the anionic polymer flocculant described above, generally used anionic polymer flocculants may be used, and in particular, a copolymer between an anionic monomer and acrylamide or a hydrolysate of a polyacrylamide may be used. As particular examples of the anionic monomer, acrylic acid or a salt thereof is preferably used. As the anionic monomer, besides acrylamide and its salt, a polymer product obtained by copolymerization between acrylamide and 2-acrylamide-2-methylpropane sulfonic acid or its salt is also particularly preferably used since being stably usable in a wide pH range.

The finished product form of the anionic polymer flocculant is not particularly limited, and commercially available general forms used for drainage-water flocculation treatment, such as a powder, a W/O type emulsion, and a dispersion in which anionic polymer flocculant grains are dispersed in an aqueous medium having a high salt concentration, may be used.

The cationic group rate is the molar ratio of the cationic monomer in the total molar amount of the cationic monomer and a nonionic monomer to be copolymerized therewith. The anionic group rate is the molar ratio of the anionic monomer in the total molar amount of the anionic monomer and a nonionic monomer to be copolymerized therewith (in the case of the hydrolysate of a polyacrylamide, the anionic group rate indicates the molar rate of anionic repeating units and non-ionic repeating units).

For example, in the case of a cationic polymer flocculant obtained by copolymerization between 80 moles of acrylamide and 20 moles of a quaternary ammonium salt of (dimethylamino)ethyl acrylate, the cationic group rate is 20 mole % as shown below.

Cationic group rate [mole %]=[molar rate of cationic monomer/(molar rate of cationic monomer+molar rate of nonionic monomer)]×100=[20/(20+80)]×100=20 [mole %]

After the addition of the flocculant, a settling promoter, such as sand, may also be added.

[Addition Timing, Addition Amount, and Addition Means of Flocculant]

In the first aspect in which the inorganic coagulant is first added to the water to be treated, the cationic polymer flocculant is added to the water to be treated (raw water) simultaneously with the addition of the inorganic coagulant, immediately after the addition thereof (for example, 1 second to 1 minute, and in particular 5 to 30 seconds), or later than that. Subsequently, when mixing is performed using a stirring tank, the anionic polymer flocculant is added 1 to 10 minutes after the addition of the cationic polymer flocculant, and when mixing is performed by line mixing, the anionic polymer flocculant is added 30 seconds to 2 minutes thereafter.

A ratio Ac/Aa of an addition amount Ac of the cationic polymer flocculant to an addition amount Aa of the anionic polymer flocculant is preferably 0.1 to 1 and particularly preferably 0.4 to 0.8.

An addition amount Am of the inorganic coagulant, the addition amount Ac of the cationic polymer flocculant, and the addition amount Aa of the anionic polymer flocculant preferably satisfy the following equation.

$$0.1 < (Am/100+Ac)/Aa < 2$$

The addition of the coagulant or flocculant is performed, for example, by using a chemical injection pump.

[Flocculating and Settling Tank]

In the present invention, although a granulation type flocculating and settling tank is preferably used, the structure may also be used in which a granulation type flocculating tank and solid-liquid separation means are provided, and excess sludge out of the solid-liquid separation means is returned as seed sludge to the granulation type flocculating tank.

Figure 2:
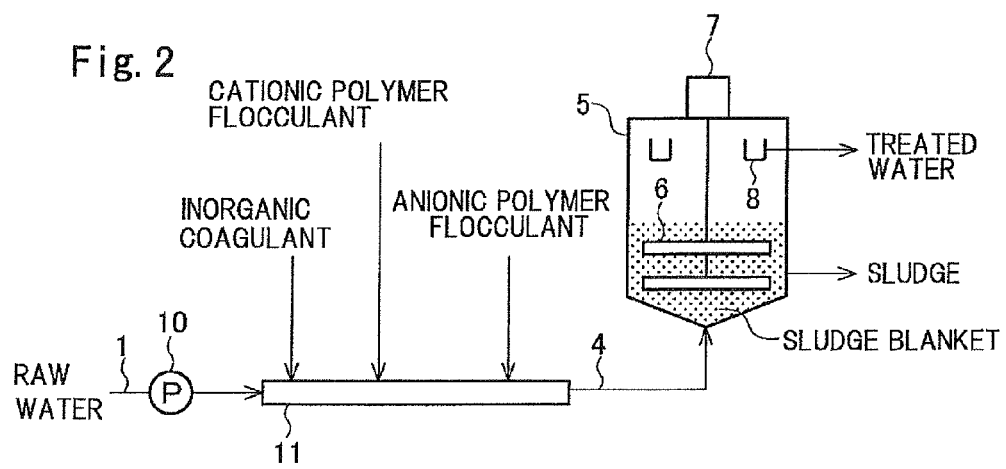
FIG. 2 shows a flow diagram of a water treatment method according to an embodiment and an apparatus therefor.

A preferable flow of the first aspect is shown in FIGS. 1 and 2.

[Flow of FIG. 1]

Raw water containing fine SS is charged into a stirring tank 2 through a piping 1 connected thereto. The inside of the stirring tank 2 is rapidly stirred by a stirring machine 3. The inorganic coagulant is added to the piping 1 or the stirring tank 2.

The pH in the stirring tank 2 is controlled to be approximately 6 to 8 with a pH controller (an alkali such as NaOH or Ca(OH)$_2$ and an acid such as HCl or H$_2$SO$_4$).

The cationic polymer flocculant is added to the piping 1 or the stirring tank 2. The addition of the inorganic coagulant, the pH controller, and the cationic polymer flocculant is preferably performed in this order or at the same time. However, when the stirring tank is used, the addition of the inorganic coagulant performed immediately after the addition of the cationic polymer flocculant may be regarded that the above additions are performed substantially at the same time.

In the stirring tank 2, positive charges of the inorganic coagulant and the cationic polymer flocculant act on negative charges of the SS to perform charge neutralization, and at the same time, polymer chains of the cationic polymer flocculant are entangled with each other by hydrogen bonds, so that robust flocs having a high density are formed although the grain diameter thereof is small.

The stirring intensity in the stirring tank 2 is preferably set to a G value of 100 to 500 s$^{-1}$, and the residence time is preferably set to 1 to 10 minutes.

The anionic polymer flocculant is added to water containing flocs formed in the stirring tank 2 (or the pipe for stirring) and is allowed to flow into a bottom portion of a granulation type flocculating and settling tank 5. The charge point of the anionic polymer flocculant is preferably set to an outflow trough of the stirring tank 2 or a water channel, such as a piping 4 connecting the stirring tank 2 and the granulation type flocculating and settling tank 5. In both cases, since the anionic polymer flocculant mixed with flocculated flocs is required to flow into the granulation type flocculating and settling tank 5 while the flocculated flocs are not sufficiently flocculated after the addition of the anionic polymer flocculant, the charge point is preferably provided so that the anionic polymer flocculant is allowed to flow into the granulation type flocculating and settling tank 5 immediately after the addition thereof (for example, 1 second to 1 minute and in particular, 5 to 30 seconds).

In the granulation type flocculating and settling tank 5, a sludge blanket in which flocculates (pebbles) having a significantly high settling rate are maintained is formed. Besides the supply of pebbles from the outside of the system at an initial operation stage, if pebbles are formed by growing flocculates by operation of granulation type flocculating and settling, a sludge blanket in which pebbles are maintained may also be formed. When the water allowed to flow into the bottom portion of the granulation type flocculating and settling tank 5 passes through the sludge blanket (hereinafter simply referred to as "blanket" in some cases) as an upward direction flow, the flocs are adsorbed on the pebbles in the blanket to perform solid-liquid separation, so that clear water (such as an SS concentration of 20 mg/L or less and in particular, 10 mg/L or less) is only allowed to flow out of a trough 8 as treated water.

Since a shearing force is applied to the blanket by stirring paddles 6 of a granulation stirring machine 7, mechanical dehydration of flocs are promoted, and as a result, granulated pebbles are formed. When the water containing the anionic polymer flocculant and flocs passes through this blanket, the flocs are strongly adsorbed to the pebbles, and the suspended solids are removed thereby, so that pebbles which are not likely to be disintegrated by a shearing force are formed. The granulated pebbles (granulated sludge) are pulled out of the bottom portion of the granulation type flocculating and settling tank 5. Since the dehydration of flocs is promoted in a pebble formation process, the density of the granulated sludge is increased. Clear treated water thus obtained is recovered through the trough 8 located at the top portion of the granulation type flocculating and settling tank 5.

The stirring intensity of the blanket in this granulation type flocculating and settling tank 5 is set preferably to be a G value of 2 to 150 s$^{-1}$ and particularly preferably to be a G value of 5 to 100 s$^{-1}$. The SS concentration of the blanket is preferably 2,000 to 100,000 mg/L and particularly preferably 4,000 to 60,000 mg/L. In addition, a water flow LV of the granulation type flocculating and settling tank is preferably set to 5 to 90 m/hr and particularly preferably set to 10 to 70 m/hr.

[Flow of FIG. 2]

A flow of FIG. 2 is a flow using a line mixer 11 instead of using the stirring tank 2. Raw water is allowed to flow through this line mixer 11 by a raw water pump 10. To this line mixer 11, the inorganic coagulant, the cationic polymer flocculant, and the anionic polymer flocculant are added. The rest of the structure is the same as that shown in FIG. 1. The mixing intensity of the line mixer 11 is preferably set to a G value of approximately 100 to 500 s$^{-1}$ and the residence time is preferably 30 to 120 seconds and particularly preferably approximately 30 to 60 seconds. As described above, as the index of the stirring intensity of the stirring mixing by the stirring blade and that of the mixing intensity of the line mixing, the average velocity gradient value (G value) represented by the following equation is used. In the case of the stirring mixing, the G value can be obtained from the size, the number, and the rotation speed of the stirring blade, and in the case of the line mixing, the G value can be obtained from the flow velocity and the pressure loss.

$$G=\sqrt{(g \cdot w/\mu)}$$

g: acceleration of gravity (=9.8) (m/s$^2$)
w: workload per unit time and unit volume (kg·m/m$^3$·s)
μ: viscosity coefficient of water (kg/m·s)

[Flow of FIG. 3]

A flow of FIG. 3 is configured such that in the flow of FIG. 1, a second stirring tank 20 is provided as a granulation type flocculating tank at a downstream of the stirring tank 2, the anionic polymer flocculant is added to this second stirring tank 20, and stirring is carried out by a stirring machine 21 so as to perform granulation in the second stirring tank 20. Water flowing out of this second stirring tank 20 is charged into a feed well 31 of a settling tank 30 and is then charged from a bottom portion of the feed well 31 to a bottom portion of the settling tank 30. After granulated sludge settled in the settling tank 30 is collected toward a central portion thereof by scraping with a sludge collecting rake 32, the granulated sludge is partially returned to the second stirring tank 20 through a sludge return line 33 as seed sludge used for granulation, and the remaining sludge is removed through a removing line 34.

Supernatant water is recovered as treated water through a trough 35. The rest of the structure is the same as that shown in FIG. 1.

In all the flows shown in FIGS. 1 to 3, flocs having a high mechanical strength are generated in the settling tank 5 and the second stirring tank 20. Although the reason for this is not clearly understood in detail, the mechanism may be considered as described below. That is, the SS in the raw water is charge-neutralized with the inorganic coagulant and the cationic polymer flocculant to form a composite. When the anionic polymer flocculant is added to this composite, besides electrostatic functions between cations and anions, by hydrogen bonds of nonionic chains based on acrylamide units, flocs are entangled with each other, and the bonds therebetween are enhanced.

Since the hydrogen bond formed by acrylamide (nonionic chain in the polymer flocculant) significantly works, a polymer flocculant having a large number of nonionic chains is preferable. In addition, a predetermined amount of cationic chains is required with respect to SS negative charges of the water to be treated. Hence, it is believed that a cationic polymer flocculant to be used preferably has a low cationic degree and a high molecular weight. In addition, as for the anionic polymer flocculant, since the hydrogen bond formed by acrylamide (nonionic chain) also significantly works as in the case described above, an anionic polymer flocculant having a large number of nonionic chains is preferable. In addition, a predetermined amount of anionic chains is required with respect to positive charges derived from a flocculant remaining in flocculated flocs in the water to be treated. Hence, it is believed that an anionic polymer flocculant to be used preferably has a low anionic degree and a high molecular weight.

Since a cationic polymer flocculant having a cationic group rate of 10 to 50 mole % is added simultaneously with the addition of the inorganic coagulant or later than the addition thereof and is then stirred, it is believed that compared to the case in which the anionic polymer flocculant is added without the addition of the cationic polymer flocculant, the rate in which water molecules are trapped is decreased, and as a result, flocs having a high density can be formed. Subsequently, since the anionic polymer flocculant is added to perform granulation while being mixed with flocs, the flocs are strongly adsorbed to pebbles in the blanket zone by an adsorption force of the anionic polymer flocculant, so that high-density flocs grow larger. In this step, by the use of a low ionic flocculant, hard flocs having a higher density can be formed. However, when the ionicity is excessively low, degradation in dispersibility and/or decrease in absorption force may cause a problem in some cases, and as a result, reduction in clarifying property and increase in amount of chemical reagents to be used may occur in some cases; hence, catinic polymer flocculant and anionic polymer flocculant are each required to have an appropriate ionicity.

Since the bonds between flocs are strong as described above, the pellets are not likely to be finely disintegrated during granulation stirring. As a result, the ratio of fine SS flowing into treated water can be reduced.

Since the bonding force between flocs is increased, water trapped between flocs is likely to escape, and a mechanical dehydration function by stirring can be promoted. Hence, flocculates having a high settling rate can be formed. In addition, since the granulation is promoted, the density of granulated sludge to be generated is increased. Accordingly, the size of facilities to be installed in a subsequent dehydration step can be reduced.

Since positive charges of the cationic polymer flocculant act on negative charges of SS, the amount of an inorganic coagulant to be used can be reduced.

<Second Aspect of Neutralization Treatment and Flocculation Treatment of Heavy Metal-Containing Water>

A second aspect of the present invention is applied to heavy metal-containing water as water to be treated and relates to a water treatment method and an apparatus therefor, in each of which after water to be treated is neutralized to settle a heavy metal hydroxide, and a cationic polymer flocculant and an anionic polymer flocculant are then added, granulation is performed by stirring, and solid-liquid separation is then performed to obtain treated water.

[Water to be Treated and Flocculant]

Water to be treated of the second aspect is water containing at least one heavy metal, such as plating drainage, pickling drainage, or etching drainage. As the heavy metal, for example, Fe, Zn, Cr, Mn, Ni, Pb, Cd, Cu, Sn, Al, or Mg may be mentioned. The content of the heavy metal is preferably set so that the content of a heavy metal hydroxide generated by neutralization is 1 to 20,000 mg/L and particularly 20 to 1,000 mg/L.

As a neutralizer, at least one type of sodium hydroxide, potassium hydroxide, and the like is preferable. The pH after the neutralization treatment is preferably approximately 6 to 8. In addition, when the heavy metal is hexavalent chromium, a reduction treatment which reduces hexavalent chromium to a lower valent chromium is preferably performed prior to the neutralization treatment by adding a reducing agent to the water to be treated.

Preferable types and addition amounts of the cationic polymer flocculant and the anionic polymer flocculant are similar to those of the first aspect.

[Addition Timing, Addition Amount, and Addition Means of Cationic Polymer Flocculant]

In the second aspect, the cationic polymer flocculant is added to the water to be treated (raw water) simultaneously with the addition of an alkali used for neutralization, immediately after the addition thereof (for example, 1 second to 1 minute, and in particular 5 to 30 seconds), or later than that. Subsequently, when mixing is performed using a stirring tank, the anionic polymer flocculant is added 1 to 10 minutes after the addition of the cationic polymer flocculant, and when mixing is performed by line mixing, the anionic polymer flocculant is added 30 seconds to 2 minutes thereafter.

In this aspect, the ratio Ac/Aa of the addition amount Ac of the cationic polymer flocculant to the addition amount Aa of the anionic polymer flocculant is also preferably 0.1 to 1 and particularly preferably 0.4 to 0.8.

[Flocculating and Settling Tank]

In this second aspect, although a granulation type flocculating and settling tank is also preferably used, the structure may be used in which a granulation type flocculating tank and solid-liquid separation means are provided, and excess sludge out of the solid-liquid separation means is returned as seed sludge to the granulation type flocculating tank.

Figure 11:
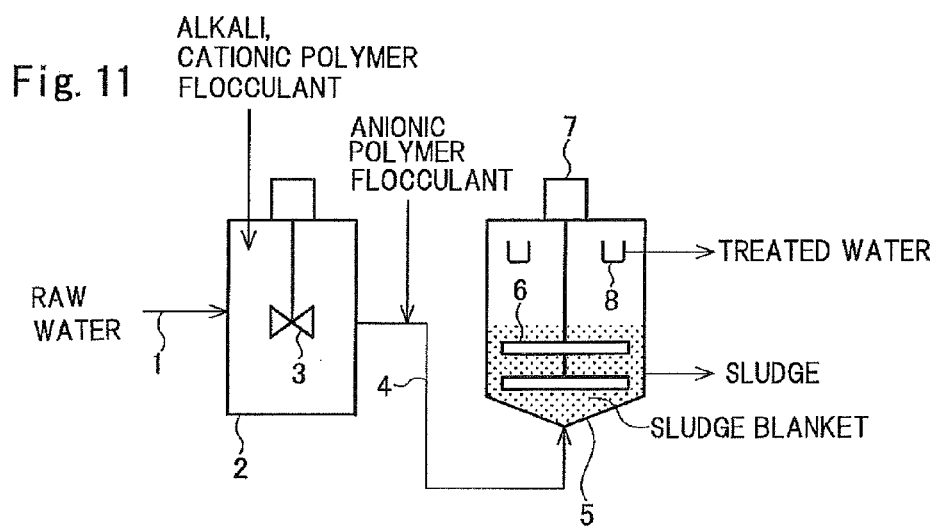
FIG. 11 shows a flow diagram of a water treatment method according to an embodiment and an apparatus therefor.

A preferable flow of the second aspect is shown in FIG. 11.

Raw water containing a heavy metal is charged in a stirring tank 2 through a piping 1 connected thereto, and the pH in the stirring tank 2 is controlled to be approximately 6 to 11 with a pH controller (an alkali such as NaOH or $Ca(OH)_2$), so that a heavy metal hydroxide is settled.

The cationic polymer flocculant is added to the stirring tank 2 or the raw water supply piping 1 connected thereto. The addition of the pH controller and that of the cationic polymer flocculant are preferably performed in this order or at the same time. However, when the addition is performed to the stirring tank 2, the addition of an inorganic coagulant performed immediately after the addition of the cationic polymer flocculant may be regarded that the above additions are performed substantially at the same time.

In the stirring tank 2, positive charges of the cationic polymer flocculant act on negative charges of the heavy metal hydroxide to perform charge neutralization, and polymer chains of the cationic polymer flocculant are entangled with each other by hydrogen bonds, so that robust flocs having a high density are formed although the grain diameter thereof is small.

The stirring intensity in the stirring tank 2 is preferably set to a G value of 100 to 500 $s^{-1}$, and the residence time is preferably set to 1 to 10 minutes.

The anionic polymer flocculant is added to the water containing flocs formed in the stirring tank 2 and is allowed to flow into a bottom portion of a granulation type flocculating and settling tank 5. A charge point of the anionic polymer flocculant is preferably set to an outflow trough of the stirring tank 2 or a water channel, such as a piping 4 connecting the stirring tank 2 and the granulation type flocculating and settling tank 5. In both cases, since the anionic polymer flocculant mixed with flocculated flocs is required to flow into the granulation type flocculating and settling tank 5 while the flocculated flocs are not sufficiently flocculated after the addition of the anionic polymer flocculant, the charge point is preferably provided so that the anionic polymer flocculant is allowed to flow into the granulation type flocculating and settling tank 5 immediately after the addition thereof (for example, 1 second to 1 minute and in particular, 5 to 30 seconds).

In the granulation type flocculating and settling tank 5, a sludge blanket in which flocculates (pebbles) having a significantly high settling rate are maintained is formed as in the case of the first aspect. When the water allowed to flow into the bottom portion of the granulation type flocculating and settling tank 5 passes through the sludge blanket as an upward direction flow, the flocs are adsorbed on the pebbles in the blanket to perform solid-liquid separation, so that clear water (such as an SS concentration of 20 mg/L or less and in particular, 10 mg/L or less) is only allowed to flow out of a trough 8 as treated water.

Preferable ranges of the stirring intensity of the blanket in this granulation type flocculating and settling tank 5, the SS concentration, and the water flow LV are similar to those of the first aspect.

According to the flow shown in FIG. 11, flocs of heavy metal hydroxides having a high mechanical strength are also generated in the settling tank 5.

EXAMPLES

Hereinafter, examples and comparative examples will be described. In the following description, a cationic polymer flocculant and an anionic polymer flocculant may be called a cationic polymer and an anionic polymer, respectively, in some cases. In addition, Examples 1 to 3 are examples of the first aspect, and Example 4 is an example of the second aspect.

Experiment 1

Experiment Performed by Changing Treatment Method and Type of Polymer Flocculant to be Added Example 1

Raw water prepared by adding 200 mg/L of kaolin to industrial water was processed by the flow shown in FIG. 1. Water was supplied at a flow rate of 4.2 $m^3/h$ so that the surface loading (LV) to the granulation type flocculating and settling tank was 60 m/hr. PAC (addition amount: 150 mg/L) was used as the inorganic coagulant, and neutralization was performed by using a 25%-sodium hydroxide solution as a neutralizer. As the cationic polymer flocculant, 1 mg/L of a cationic polymer flocculant c (cationic group rate: 20 mole %) obtained by polymerization between acrylamide and (dimethylamino)ethyl acrylate, methyl chloride quaternary salt was added, and 2 mg/L of an anionic polymer flocculant a (anionic group rate: 12 mole %) obtained by polymerization between acrylamide and sodium acrylate was added as the anionic polymer flocculant.

The residence time in the stirring tank 2 was set to 2 minutes, and the G value was set to 200 $s^{-1}$. The granulation type flocculating and settling tank was formed to have a diameter of 300 mm and a height of 1,200 mm, the G value in the blanket zone was set to 50 $s^{-1}$, and the blanket zone was formed to have a height of up to 600 mm. The SS concentration of the blanket was 50,000 mg/L.

The grain diameter distribution of granulated grains (flocs) in the blanket zone, the apparent floc density, and the SS concentration of treated water are shown in Table 1.

Example 2

By the flow shown in FIG. 2, the same raw water as that used in Example 1 was processed. The G value in the line mixing apparatus was set to 200 s$^{-1}$, and the residence time was set to 30 seconds. The other conditions were set to the same as those of Example 1. The grain diameter distribution of granulated grains (flocs) in the blanket zone, the apparent floc density, and the SS concentration of treated water are shown in Table 1.

Example 3

In accordance with the flow shown in FIG. 3, raw water was processed. In particular, 200 mg/L of PAC, 1 mg/L of the cationic polymer flocculant c, and 3 mg/L of the anionic polymer flocculant a were added. The G value in the first stirring tank 2 and that in the second stirring tank 20 were set to 150 s$^{-1}$ and 80 s$^{-1}$, respectively, and the residence times were each set to 5 minutes.

The other conditions were set to the same as those of Example 1. The grain diameter distribution of granulated grains (flocs) in the blanket zone, the apparent floc density, and the SS concentration of treated water are shown in Table 1.

Comparative Example 1

In Example 1, the additional position for 1 mg/L of the cationic polymer flocculant c and that for 2 mg/L of the anionic polymer flocculant a were reversed. That is, the cationic polymer flocculant c was added to the piping 4, and the anionic polymer flocculant a was added to the stirring tank 2. The other conditions were set to the same as those of Example 1. The grain diameter distribution of granulated grains (flocs) in the blanket zone, the apparent floc density, and the SS concentration of treated water are shown in Table 1.

Comparative Example 2

In Example 1, 200 mg/L of PAC and 3 mg/L of the anionic polymer flocculant a were added, and no cationic polymer flocculant was added. The other conditions were set to the same as those of Example 1. The grain diameter distribution of granulated grains (flocs) in the blanket zone, the apparent floc density, and the SS concentration of treated water are shown in Table 1.

Comparative Example 3

In Example 1, the addition amount of PAC was set to 200 mg/L, and 4 mg/L of a first amphoteric polymer flocculant having a cationic group rate lower than an anionic group rate was added to the stirring tank 2. The cationic polymer flocculant and the anionic polymer flocculant used in Example 1 were not added.

The other conditions were set to the same as those of Example 1. The grain diameter distribution of granulated grains (flocs) in the blanket zone, the apparent floc density, and the SS concentration of treated water are shown in Table 1.

Comparative Example 4

In Example 1, the addition amount of PAC was set to 200 mg/L, 3 mg/L of the anionic polymer flocculant a was added to the stirring tank 2, and 1 mg/L of a second amphoteric polymer flocculant having a cationic group rate higher than an anionic group rate was added to the piping 4.

The other conditions were set to the same as those of Example 1. The grain diameter distribution of granulated grains (flocs) in the blanket zone, the apparent floc density, and the SS concentration of treated water are shown in Table 1.

The apparent floc density was obtained by a grain settling rate equation using a floc settling rate of each floc and the diameter thereof, each of which was measured by a high-speed camera.

TABLE 1

| | Flow | Inorganic Coagulant | Polymer Flocculant (Polymer) | Ac/Aa | (Am/ 100 + Ac)/Aa | 10 vol. %-Grain Diameter (mm) | 50 vol. %-Grain Diameter (mm) | 90 vol. %-Grain Diameter (mm) | Apparent Floc Density (kg/L) | SS Concentration of Treated Water (mg/L) |
|---|---|---|---|---|---|---|---|---|---|---|
| Example 1 | FIG. 1 | PAC (150 mg/L) | Cationic Polymer (1 mg/L)→ Anionic Polymer (2 mg/L) | 0.5 | 1.25 | 2 | 6 | 8 | 1.13 | 0.1 |
| Example 2 | FIG. 2 | PAC (150 mg/L) | Cationic Polymer (1 mg/L)→ Anionic Polymer (2 mg/L) | 0.5 | 1.25 | 2 | 6 | 8 | 1.13 | 0.2 |
| Example 3 | FIG. 3 | PAC (200 mg/L) | Cationic Polymer (1 mg/L)→ Anionic Polymer (3 mg/L) | 0.3 | 1 | 0.5 | 3 | 7 | 1.08 | 5 |
| Comparative Example 1 | FIG. 1 | PAC (200 mg/L) | Anionic Polymer (2 mg/L)→ Cationic Polymer (1 mg/L) | 0.5 | 1.5 | 1 | 3 | 7 | 1.09 | 8 |
| Comparative Example 2 | FIG. 1 | PAC (200 mg/L) | Anionic Polymer (3 mg/L) | 0 | 0.6 | 1 | 3 | 7 | 1.04 | 40 |
| Comparative Example 3 | FIG. 1 | PAC (200 mg/L) | Anionic Amphoteric Polymer (4 mg/L) | — | — | 1 | 4 | 7 | 1.05 | 14 |
| Comparative Example 4 | FIG. 1 | PAC (200 mg/L) | Anionic Polymer (2 mg/L)→ Cationic Amphoteric Polymer (1 mg/L) | — | — | 1 | 4 | 8 | 1.08 | 9 |

Cationic Polymer: Cationic Polymer Flocculant c
Anionic Polymer: Anionic Polymer Flocculant a
Anionic Amphoteric Polymer: First Amphoteric Polymer Flocculant
Cationic Amphoteric Polymer: Second Amphoteric Polymer Flocculant

DISCUSSION (1) According to the results of Examples 1 and 2, it is found that the line mixer may also be used instead of using a stirring tank.
(2) From Example 1 and Comparative Example 1, it is found that the addition is preferably performed in the order of from the cationic polymer flocculant to the anionic polymer flocculant.
(3) From Example 1 and Comparative Example 2, it is found that the addition of the cationic polymer flocculant is necessary.
(4) From Examples 1 and 3, it is found that although the performance can be obtained by a method in which the granulation type flocculating tank and the solid-liquid separation means are used, and excess sludge is returned as seed sludge, the method using the granulation type flocculating and settling tank is more preferable as compared to that described above in view of the SS concentration of treated water.
(5) From Example 1 and Comparative Examples 3 and 4, it is found that the effect of the amphoteric polymer flocculant is inferior.

Experiment 2

Experiment Performed by Changing Ionic Group Rate and Weight Average Molecular Weight of Polymer Flocculant Except that in the flow shown in FIG. 1, the ionic group rate and the weight average molecular weight of a cationic polymer flocculant or an anionic polymer flocculant to be added were changed, the raw water was processed under the same conditions as those of Example 1, and the SS concentration of treated water and the floc settling rate were investigated. The settling rate of flocs was calculated from the time required for completion of settlement of 90% or more of flocs and the settlement distance thereof, each of which was obtained by settling flocs in a 500-mL measuring cylinder. The results are shown in FIGS. 4 to 7.

In this experiment, the weight average molecular weight of the cationic polymer flocculant and that of the anionic polymer flocculant were calculated by the following method.

[Weight Average Molecular Weight of Cationic Polymer Flocculant]

The weight average molecular weight (MW) of the cationic polymer flocculant was calculated by the following method using a viscosity equation of a homopolymer of a methyl chloride quaternary salt of (dimethylamino)methyl methacrylate (hereinafter referred to as "DAM quaternary salt"): $[\eta]=4.09\times10^{-5}$ $Mw^{0.73}$ [by Tadaya Kato, Polymer Flocculant Gathering Report, "Experimental Subject: Determination of Viscosity Equation of Homocation (DM-MC)" Mar. 23, 1998].

First, from the inherent viscosity (unit: dl/g) of the cationic polymer flocculant measured in a 1 N-aqueous NaCl solution at 25° C., the Mw was calculated using the above viscosity equation. The calculated Mw was divided by a molecular weight of 207.5 of the DAM quaternary salt to calculate the degree of polymerization. This degree of polymerization was multiplied by a molecular weight of 95.6 of one unit of the used cationic polymer flocculant (copolymer of acrylamide/(dimethylamino)ethyl acrylate methyl chloride quaternary salt having a cationic group rate of 20 mole %), and the value obtained thereby was regarded as the weight average molecular weight.

[Weight Average Molecular Weight of Anionic Polymer Flocculant]

As for the weight average molecular weight (Mw) of the anionic polymer flocculant, the Mw was calculated using a viscosity equation of a polyacrylamide polymer: $[\eta]=3.73\times10^{-4}$ $Mw^{0.66}$ [Radical Polymerization Handbook, published by NTS Co., Ltd., p 558 (1999)]. For the calculation of the weight average molecular weight of the anionic polymer flocculant, as the inherent viscosity $[\eta]$, a value (unit: dl/g) measured in a 1 N-aqueous $NaNO_3$ solution at 30° C. was used. In addition, since the molecular weight of acrylic acid was approximately equivalent to that of acrylamide, unlike the case of the cationic polymer flocculant, the Mw calculated using the above equation was regarded as the weight average molecular weight of the anionic polymer flocculant without performing conversion into the degree of polymerization.

In FIGS. 4 and 6, the quality of treated water at an LV of 60 m/hr is shown, the data being obtained by changing the ionic group rate without changing the molecular weight of the cationic polymer flocculant and that of the anionic polymer flocculant. As shown in the figures, in both cases of the cationic polymer flocculant and the anionic polymer flocculant, as the ionic group rate was decreased, the quality of treated water was improved. However, the quality of treated water was degraded at an excessively small cationic group rate. That is, it was found that the cationic group rate of the cationic polymer flocculant is preferably 10 to 50 mole %, particularly preferably 15 to 40 mole %, and further preferably 20 to 30 mole %, and that the anionic group rate of the anionic polymer flocculant is preferably 5 to 30 mole %.

Figure 7:
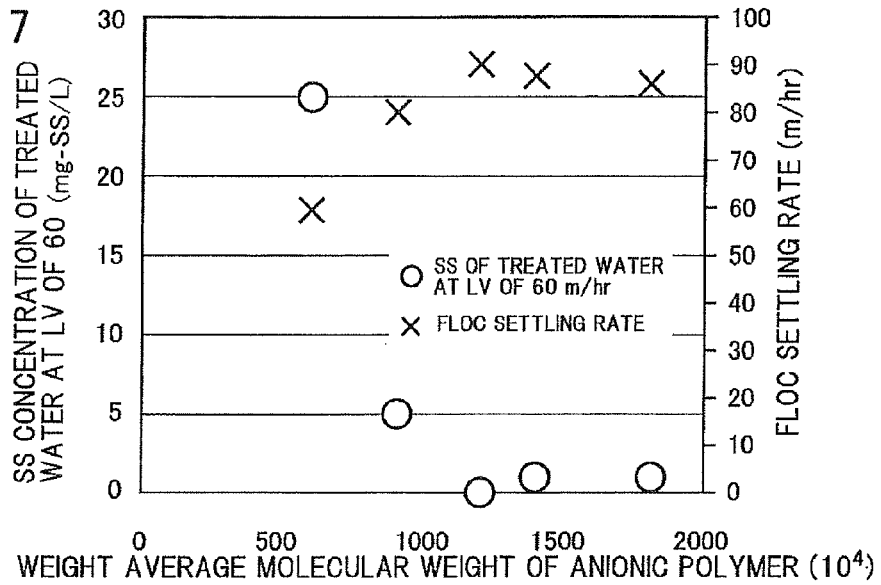
FIG. 7 is a graph showing experimental results.

In FIGS. 5 and 7, the quality of treated water at an LV of 60 m/hr is shown, the data being obtained by changing the weight average molecular weight without changing the ionic group rate of the cationic polymer flocculant and that of the anionic polymer flocculant. In both cases of the cationic polymer flocculant and the anionic polymer flocculant, as the weight average molecular weight was increased, the quality of treated water was improved. That is, the weight average molecular weight of the cationic polymer flocculant is preferably 12,000,000 or more, and the weight average molecular weight of the anionic polymer flocculant is preferably 9,000,000 or more.

Experiment 3

Experiment Performed by Changing Addition Amount Ratio of Cationic Polymer Flocculant/Anionic Polymer Flocculant Except that in the flow shown in FIG. 1, the ratio in addition amount between the cationic polymer flocculant and the anionic polymer flocculant was changed, the raw water was processed under the same conditions as those of Example 1, and the SS concentration of treated water and the floc settling rate were investigated.

Figure 8:
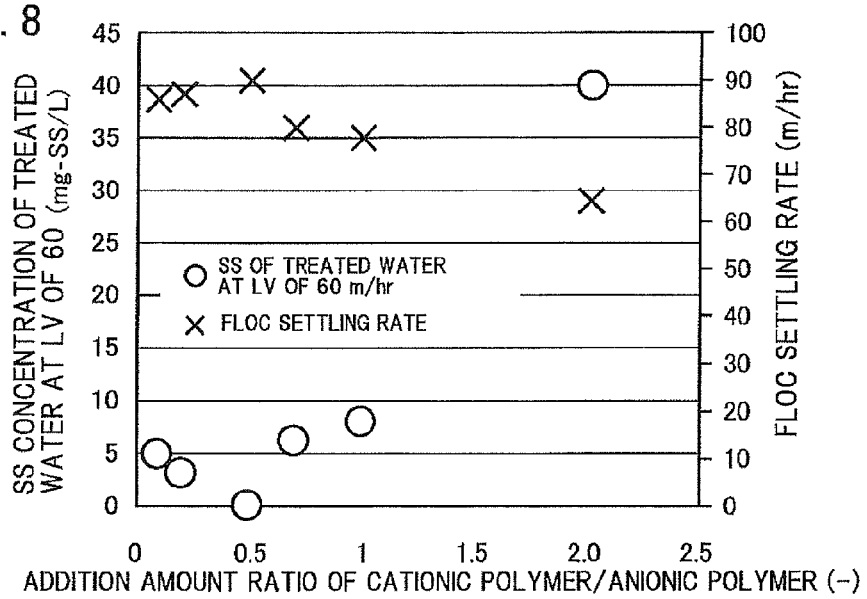
FIG. 8 is a graph showing experimental results.

In FIG. 8, the relationships of the addition amount ratio of the cationic polymer flocculant c/the anionic polymer flocculant a with the SS concentration of treated water and the floc settling rate are shown. As shown in FIG. 8, when the addition amount ratio of the cationic polymer flocculant/anionic polymer flocculant was in a range of 0.1 to 1, the floc settling rate was preferable, such as approximately 75 to 90 m/hr, and the SS concentration of treated water was preferable, such as 10 mg/L or less. However, when the addition amount ratio was set to 2, the floc settling rate was decreased, and the SS concentration of treated water was degraded to up to 40 mg/L. From the results described above, it is found that in order to obtain pebbles having a preferable floc settling rate, the addition amount ratio of the cationic polymer flocculant and the anionic polymer flocculant is required to be set to 0.1 to 1.

Experiment 4

Experiment Performed by Changing Addition Amount Ratio of (Am/100+Ac)/Aa

Except that in the flow shown in FIG. 1, the addition amount of the anionic polymer flocculant a was set to 2 mg/L, and the addition amount of the inorganic coagulant and that of the cationic polymer flocculant c were changed, the raw water was processed under the same conditions as those of Example 1, and the SS concentration of treated water and the floc settling rate were investigated.

Figure 9:
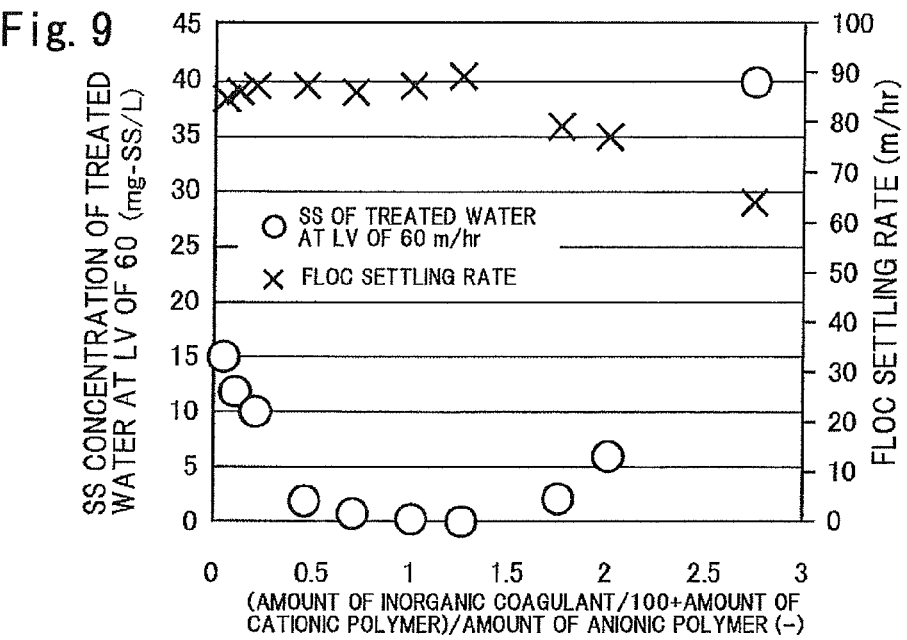
FIG. 9 is a graph showing experimental results.

In FIG. 9, the relationships of the addition amount ratio of (Am/100+Ac)/Aa with the SS concentration of treated water and the floc settling rate are shown. As shown in FIG. 9, when the addition amount ratio of (Am/100+Ac)/Aa was 0.1 to 2, the floc settling rate was preferable, such as 79 m/hr or more, and the SS concentration of treated water was preferable, such as 20 mg/L or less.

However, when the addition amount ratio of (Am/100+Ac)/Aa was set to 2.8, the floc settling rate was decreased to 65 m/h, and the SS concentration of treated water was degraded to up to 40 mg/L.

From the results described above, it is found that in order to obtain pebbles having a preferable floc settling rate, the addition amount ratio of (Am/100+Ac)/Aa is required to be set to 0.1 to 2.

Experiment 5

Experiment Performed by Changing G Value of Stirring of Blanket

Except that the G value of blanket stirring was changed in the flow shown in FIG. 1, the raw water was processed under the same conditions as those of Example 1, and the SS concentration of treated water and the floc settling rate were investigated.

Figure 10:
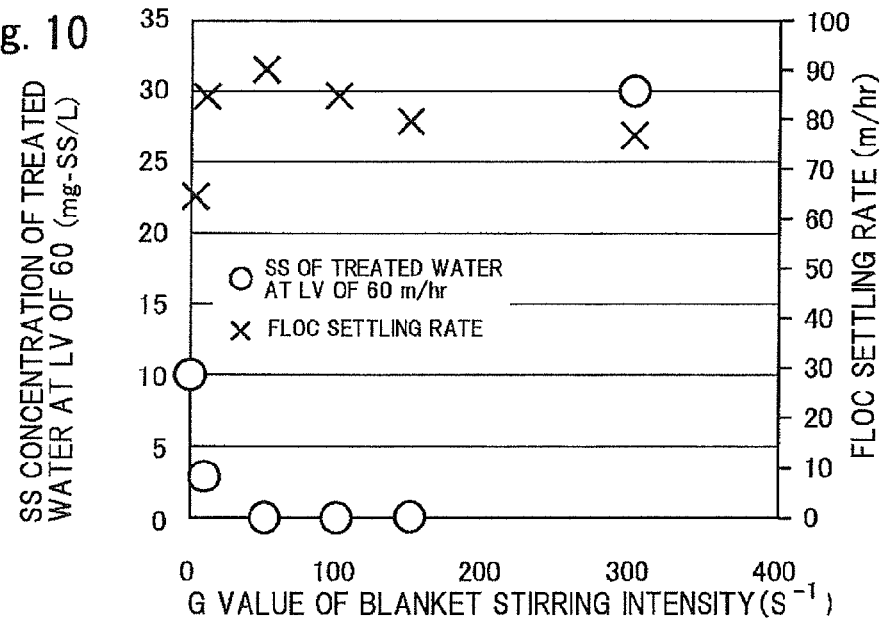
FIG. 10 is a graph showing experimental results.

In FIG. 10, the relationships of the G value of stirring of the blanket with the SS concentration of treated water and the floc settling rate are shown. As shown in FIG. 10, when the G value was set to 5 to 150 $s^{-1}$, the floc setting rate was increased, and preferable treated water having an SS concentration of 10 mg/L or less was obtained. However, when the G value was set to 300 $s^{-1}$, curling of flocs occurred, and the quality of treated water was degraded. In addition, when the G value was set to 1 $s^{-1}$, the floc settling rate was decreased, and the SS concentration of treated water was increased. The reason for this is believed that when the G value is low, since mechanical dehydration of flocs is not promoted, the settling rate was decreased. Hence, the G value of stirring of the blanket is required to be set to 5 to 150 $s^{-1}$.

Example 4

Second Aspect

In accordance with the flow shown in FIG. 11, Cu (copper)-containing drainage water having the quality shown in Table 2 was processed. Major conditions are as shown below.

Flow rate of raw water: 1 $m^3$/hr
Stirring tank: volume 80 L
  pH 8.4 (addition of NaOH)
  HRT 5 minutes
  cationic polymer flocculant c addition of 1 mg/L
Addition amount of anionic polymer flocculant a: 2 mg/L (addition to piping 4)
Granulation type flocculating and settling tank:
  Diameter 300 mm
  Height 1,500 mm
  LV 15 m/hr
The quality of treated water is shown in Table 2.

Comparative Example 5

Except that in Example 4, a cationic polymer flocculant c' having a cationic group rate (cationic group rate: 60 mole %) different from that of the cationic polymer flocculant c was used as the cationic polymer flocculant, a process was performed in a manner similar to that described above. The quality of treated water is shown in Table 2.

TABLE 2

| Item | Raw Water | Example 4 | Comparative Example 5 |
|---|---|---|---|
| pH (—) | 5.5 | 6.9 | 7.1 |
| SS (mg/L) | 18 | 4 | 12 |
| Cu (mg/L) | 19 | 0.45 | 3 |

As shown in Table 2, according to the present invention, the quality of treated water is improved.

The present invention is based on a Japanese Patent Application No. 2012-198559, filed Sep. 10, 2012, which is hereby incorporated by reference herein in its entirety.

REFERENCE SIGNS LIST

2 stirring tank (first stirring tank)
5 granulation type flocculating and settling tank
11 line mixer
20 second stirring tank
30 settling tank

The invention claimed is:
1. A water treatment method comprising:
a flocculating step of adding an anionic polymer flocculant to water to be treated containing suspended solids to form flocculated flocs;
a granulating step of stirring the water to be treated to granulate the flocculated flocs; and
a solid-liquid separating step of performing solid-liquid separation of generated granulated substances to obtain treated water,
wherein before the anionic polymer flocculant is added, a cationic polymer flocculant having a cationic group rate of 10 to 50 mole % is added to the water to be treated,
wherein an inorganic coagulant is added to the water to be treated together with the cationic polymer flocculant or before the addition of the cationic polymer flocculant, and
wherein the granulating step and the solid-liquid separating step are performed in a granulation type flocculating and settling tank maintaining a sludge blanket therein.
2. The water treatment method according to claim 1, wherein an addition amount Am of the inorganic coagulant, an addition amount Ac of the cationic polymer flocculant, and an addition amount Aa of the anionic polymer flocculant satisfy the following equation:

$$0.1 < (Am/100 + Ac)/Aa < 2.$$

3. The water treatment method according to claim 1, wherein the water to be treated contains a heavy metal, the method further comprising, before the addition of the anionic polymer flocculant, a neutralizing step of performing a neutralization treatment on the water to be treated to settle a heavy metal hydroxide.

4. The water treatment method according to claim 1, wherein immediately before the granulating step is performed, the anionic polymer flocculant is added.

5. The water treatment method according to claim 1, wherein the anionic polymer flocculant is a low ionic anionic polymer flocculant having an anionic group rate of 30 mole % or less.

6. The water treatment method according to claim 1, wherein the weight average molecular weight of the cationic polymer flocculant is 12,000,000 to 22,000,000.

7. The water treatment method according to claim 1, wherein the weight average molecular weight of the anionic polymer flocculant is 9,000,000 to 18,000,000.

8. The water treatment method according to claim 1, wherein the ratio of Ac/Aa of the addition amount Ac of the cationic polymer flocculant to the addition amount Aa of the anionic polymer flocculant is 0.1 to 1.

9. The water treatment method according to claim 1, wherein a G value in a stirring tank obtained when the cationic polymer flocculant is added and stirred is set to 2 to 150 s$^{-1}$.

10. The water treatment method according to claim 1, wherein the solid-liquid separation is performed in a granulation type flocculating and settling tank, and an SS concentration of a sludge blanket in the granulation type flocculating and settling tank is set to 2,000 to 100,000 mg/L.

11. The water treatment method according to claim 10, wherein a water flow LV in the granulation type flocculating and settling tank is set to 5 to 90 m/hr.

12. The water treatment method according to claim 1, wherein the SS concentration of treated water is 20 mg-SS/L or less.

13. A water treatment apparatus comprising:
anionic polymer flocculant addition means for adding an anionic polymer flocculant to water to be treated containing suspended solids;
stirring means provided at a downstream side of the anionic polymer flocculant addition means and configured to granulate flocculated flocs by stirring water to be treated; and
solid-liquid separation means for performing solid-liquid separation of water to be treated which is stirred by the stirring means to obtain treated water,
wherein the water treatment apparatus comprises cationic polymer flocculant addition means provided at an upstream side of the anionic polymer flocculant addition means and configured to add a cationic polymer flocculant having a cationic group rate of 10 to 50 mole %,
wherein the water treatment apparatus comprises inorganic coagulant addition means for adding an inorganic coagulant to the water to be treated, the means being configured to add the inorganic coagulant together with the cationic polymer flocculant or being provided at an upstream side of the cationic polymer flocculant addition means, and
wherein the water treatment apparatus comprises a granulation type flocculating and settling tank as stirring granulation means and the solid-liquid separation means.

14. The water treatment apparatus according to claim 13, wherein the water to be treated contains a heavy metal, and the water treatment apparatus comprises neutralizing means provided at an upstream side of the cationic polymer flocculant addition means and configured to neutralize water to be treated to settle a heavy metal hydroxide.

* * * * *